Aug. 10, 1937.　　　　J. A. RICE　　　　2,089,813
FOAMING COMPOSITION
Original Filed April 27, 1931
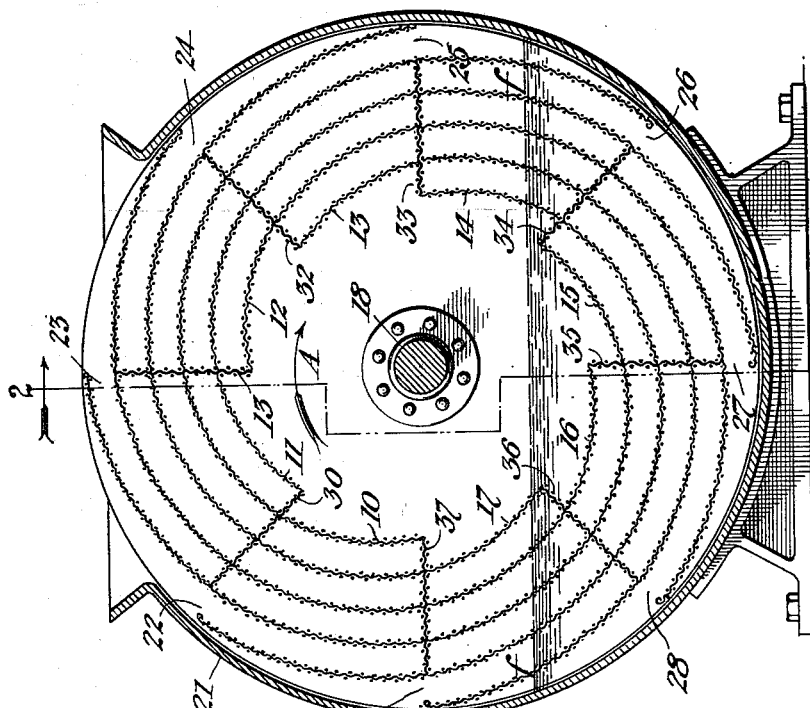
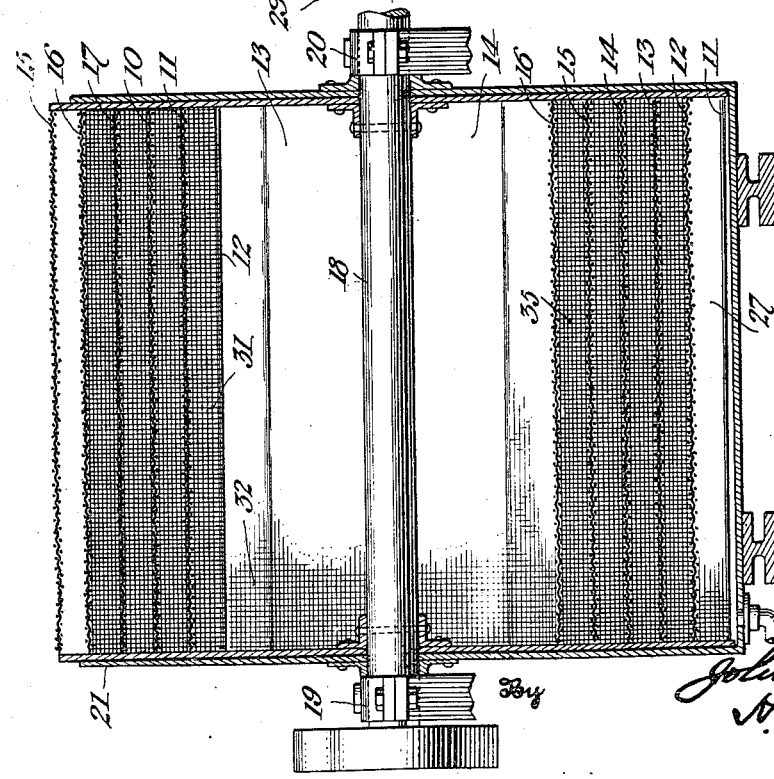

Patented Aug. 10, 1937

2,089,813

UNITED STATES PATENT OFFICE 2,089,813

FOAMING COMPOSITION

John A. Rice, Berkeley, Calif.

Application April 27, 1931, Serial No. 533,351
Renewed October 26, 1935

4 Claims. (Cl. 252—6)

My invention relates to a process and apparatus for making acoustic material and/or cellular concrete from materials such as Portland cement, gypsum and other cements, and clay etc., materials which are made plastic with a liquid and thereafter given a cellular structure by introducing cells of gas, and thereafter being hardened, retaining the cellular structure, and foaming compounds used therein.

My invention relates to foaming compounds as used in combination with Portland cement, or other cements, or clay, etc., air and water, with or without other aggregate than air, to form cellular concrete. More particularly my improvements relate to foaming compounds which are suitable to be used in forming cellular mixtures of cement, clay, etc., water and air by means of agitation, or by forcing air into slurry made of cement or clay etc., which has been prepared by introducing a proper amount of foaming compound. However, these improved compounds when diluted with water may be also used to form a suitable foam, which may subsequently be mixed with cement slurry and the like, forming cellular concrete.

Heretofore many of the existing materials and methods of making foaming compounds used for the purposes stated have not proved wholly satisfactory in commercial operation, for several reasons:—

First, they were not in suitable concentrated forms for transporting long distances and thereafter diluting with water or other cheap diluent to make them ready for use.

Second, their chemical condition was not stable, so that upon transporting and after a lapse of time, or upon long storage, the efficiency and characteristics of the compounds might change adversely, due to said chemical instability.

Third, their efficiency in general was inadequate, so that it was difficult to make a proper thick, viscid cellular mortar with cement and a satisfactorily small amount of the foaming compound.

My invention relates to foaming compounds which may be manufactured in large quantities, which have uniform foaming characteristics, and which are adapted to associate with Portland cement, gypsum and other cements, or clay and the like, without impairing the ultimate strength of the resulting cellular concrete; which have the quality of preserving the form of the spherical cells unimpaired during the setting of the cement or drying of the clay or the like; and which are in a concentrated liquid state suitable for shipment and storage and thereafter capable of dilution as much as desired with suitable solvents. The improved compounds will keep indefinitely without adverse chemical change,—that is to say they are chemically stable. The compounds are efficient as foaming compounds in the presence of calcium hydrate and other substances contained in or produced by Portland cement during hydration of the same.

My discoveries relate to the foaming nature of soluble condensation products of phenols and aldehydes, and to rosin and related soluble resinous substances, when mixed with cement or clay or the like, and water. I have discovered that when condensation products of phenols and aldehydes are dissolved in water by means of suitable solvents and mixed with slurry made with cement or clay or the like, the substances are precipitated in the form of a voluminous colloidal foamy body which remains stable during agitation and aeration and during subsequent hours while the cement is setting, holding the cellular structure effectively and efficiently without chemically changing or injuring the nature of the cement with respect to its ultimate structural strength.

My invention further comprises physical methods of rupturing the walls of the cells in materials of cellular structure, thereby forming continuous pore structure in such materials, thus especially adapting the same to be used for acoustic or non-sound reflecting surfaces, as on the walls and ceilings of auditoriums and the like.

Generally stated, my invention comprises the use of stable foaming agents, consisting of resins formed from a phenol and an aldehyde, or from an aldehyde or aldehydes, the phenol being either phenol proper or cresol (cresylic acid) or a material of similar chemical nature and the aldehyde being ordinary aldehyde, formaldehyde, fufural, or other aldehyde, all of these being used in association with cements of various kinds including Portland cement, gypsum cement, clay, kieselguhr, bentonite, or other powdered material which will "set" or solidify by chemical action or by drying after having been made plastic with water or other liquid. In place of the artificial resins formed by the condensation of a phenol or the like with an aldehyde, the invention also includes the use of hydrated metallic oxides in combination with the above materials, particularly the hydrated oxids of chromium, titanium and aluminum. In place of the synthetic resins mentioned, the invention also includes the use of rosin.

The invention consists also in an apparatus for use in introducing bubbles into the cement slurry or the like which comprises a plurality of spiral-cylindrical screens or the like arranged about a rotary shaft and secured thereto, said screens having substantially radial partitions interposed therebetween so as to divide the rotating structure into a plurality of closed cells with perforated walls which will entrain air and impregnate the material therewith when the structure is rotated by means of the shaft.

The invention relates further to a method of making acoustic material by aerating a mixture of cement and water containing a suitable foaming agent, and thereupon allowing the material thus made to set, during which setting the walls of the bubbles which form the cells will become broken down, however without the complete collapse of the structure, or in physically breaking down the cell walls by applying air pressure or partial vacuum or both to the partially set material, whereby the remaining structure will be such that it has excellent acoustic properties due to the open communicating passages therein.

In the accompanying drawing I show diagrammatically and by way of example one form of apparatus which may be used in introducing the air bubbles into the cement mixture or the like.

In said drawing Fig. 1 is a vertical transverse section of the aerating apparatus on the line I—I of Fig. 2 and Fig. 2 is a vertical central longitudinal section therethrough on the line II—II of Fig. 1.

Referring now to the invention in detail, some methods of making the foamy substances are the following:

I(a) Mix together

| | Parts by volume |
|---|---|
| Phenol | 200 |
| Formalin | 100 |
| Potassium hydroxid (water solution 40 degrees Bé.) | 10 |

Heat gradually, boiling until the temperature reaches 212 degrees F. Cool at once.

The resulting compound will be a resinous product.

I(b) To I(a) after cooling, add potassium hydroxid solution until, upon dropping a small amount in water, it is seen to be entirely soluble in water.

I(c) To I(b) add sufficient water to dilute the soluble resin to the consistency of molasses. This will require about 80 parts of water, more or less, according to the degree of concentration resulting from evaporation of water. The resulting soluble resin solution should have a specific gravity of about 20 to 22 degrees Bé.

I(d) For use as a foaming compound in the making of cellular concrete, I(c) should be diluted with water as follows:

| | Parts by weight |
|---|---|
| I(c) | 100 |
| Water | 600 | and used in the approximate proportion of two pounds to the cubic yard of cellular concrete product.

I(e) Instead of using potassium hydroxid to render the resin soluble in water and then using water for the diluting medium, alcohol may be used to dilute the resin as prepared under I(a). In such a case take

| | Parts by weight |
|---|---|
| Resin I(a) | 100 |
| Alcohol, approximately | 900 | and use in the approximate proportion of two pounds to the cubic yard of cellular concrete product.

II(a) Mix together

| | Parts by volume |
|---|---|
| Commercial cresylic acid (cresol) | 200 |
| Formaldehyde (40%) | 70 |
| Potassium hydroxid 40 deg. Bé | 10 |

Heat in a suitable container till the mixture has reached 220 degrees F. This will produce a resinous condensation product.

II(b) After cooling the resin II(a) add sufficient additional potassium hydroxid solution to render the resin soluble in water. Then add sufficient additional water to bring the specific gravity to 20 to 22 degrees Bé. so that the resin solution becomes sufficiently liquid to be conveniently handled in containers.

II(c) For use as a foaming compound in the manufacture of cellular concrete, take of

| | Parts by weight |
|---|---|
| II(b) | 100 |
| Water | 600 | and thoroughly mix together, dissolving the resin solution in the water. Use 2 pounds to the cubic yard of cellular concrete product.

II(d) Instead of using potassium hydroxid to render the resin solution soluble in water, alcohol may be used as a solvent as follows:—

| | Parts by weight |
|---|---|
| Resin solution II(a) | 100 |
| Alcohol | 900 |

III(a) Mix together

| | Parts by volume |
|---|---|
| Commercial cresylic acid | 200 |
| Commercial furfural | 70 |
| Potassium hydroxid sol. 40 deg. Bé | 10 |

Heat gradually to a temperature of 240 degrees F.

This will produce a resinous condensation product.

III(b) To III(a) add sufficient potassium hydroxid solution to render the resin solution completely soluble in water and finally add sufficient water to bring the specific gravity to 20 to 22 degrees Bé. for the purpose of convenience and standardization of strength.

III(c) For use as a foaming compound in the making of cellular concrete dilute as follows:—

| | Parts by weight |
|---|---|
| III(b) | 100 |
| Water | 600 | and use two pounds of the same to each cubic yard of cellular concrete to be made.

III(d) Using alcohol as a solvent for the resin, take

| | Parts by weight |
|---|---|
| III(a) | 100 |
| Alcohol | 900 |

After solution is complete this compound may be used in the proportion of two pounds of the compound to the cubic yard of cellular concrete to be manufactured.

IV(a) "Bakelite 'A'" liquid resin may be used by adding sufficient alkaline solvent to render it soluble in water and diluting with water to the standard dilution,—20 to 22 degrees Bé.

IV(b) For use as a foaming compound in the making of cellular concrete, dilute as follows:

| | Parts by weight |
|---|---|
| IV(a) | 100 |
| Water | 600 |

This solution may be then used as directed under III(c).

IV(c) Alcohol may be used as a solvent instead of the potassium hydroxid as follows:

| | Parts by weight |
|---|---|
| IV(a) | 100 |
| Alcohol | 900 |

This alcohol solution then may be used as directed under III(c).

Ethyl or methyl alcohol, and potassium sodium or other alkaline hydroxids may be used in the above formulas.

V(a) Rosin (colophony) may be used as a foaming agent. A suitable compound for use in making cellular concrete may be made as follows:

|  | Parts by weight |
|---|---|
| Powdered rosin | 100 |
| Water | 1000 |
| Ammonia, (approx.) | 60 |

The mixture may be heated to facilitate saponification. Enough ammonia should be added so that there is a distinct ammonia odor apparent after all the rosin has been saponified. The amount may be somewhat more or less than the proportion given above.

The use of two pounds of the above compound to the cubic yard of cellular concrete product gives satisfactory results.

V(b) Other saponifying agents may be used with rosin, for instance potassium hydroxid or sodium hydroxid. The following proportions, using potassium hydroxid have proven satisfactory:—

|  | Parts by weight |
|---|---|
| Rosin, powdered | 100 |
| Water | 1000 |
| Potassium hydroxid sol. 38 degrees Bé | 75 |

V(c) Rosin dissolved in alcohol may be used. Mix

|  | Parts by weight |
|---|---|
| Powdered rosin | 100 |
| Alcohol | 900 |

V(d) Esterified rosin prepared in the manner well known to varnish manufacturers may be used in the same way as directed in the case of plain rosin.

VI(a) Aldehyde resins, other than phenolic-aldehyde resins, also may be used as foaming compounds for use with cements in making cellular concrete. For example:

Mix together

|  | Parts by volume |
|---|---|
| Furfural, (an aldehyde) | 100 |
| Water | 300 |
| Potassium hydroxid sol. 45 degrees Bé | 100 |

Carefully heat the mixture to 212 degrees F., stirring meanwhile. A highly colored red condensation product will result.

VI(b) Dilute VI(a) as follows:

|  | Parts by weight |
|---|---|
| VI(a) | 100 |
| Water | 200 |

This water-soluble condensation product may be used in making cellular concrete by using two pounds, more or less, to the cubic yard of cellular concrete to be made.

When using the above formulae it is advisable to use the specific dilution given, for reasons of economy. However the resin and rosin solutions, if sufficiently liquid, may be diluted over a wide range of concentrations,—that is to say, little or much diluent may be used and the resultant foaminess of the compound may be satisfactory, provided a longer time of agitation be given in the case of highly diluted solutions. For reasons of economy it is well to use a minimum amount of the resins, and on the other hand, for reasons of efficiency it is well to avoid too high a dilution of the same. It is for these considerations that the above concentrations are given as preferable.

In the case of using an alcohol as a solvent, sufficient dilution of the resin, or rosin, should be obtained, so that when the alcoholic solution is added to clear water, the resin or rosin will precipitate as a finely divided, (practically colloidal), precipitate. If the solution be too concentrated, the resin or rosin will precipitate in globules and will not disseminate homogeneously throughout the water, and will quickly settle to the bottom of the vessel instead of remaining in suspension as is to be desired.

Various substances may be used to advantage as modifying agents in association with the resinous compounds used for the purpose given. For instance some hydrated metallic oxides will give body to the foamy substances produced, and several such substances have the advantageous effect of causing Portland cement to set more quickly and to attain greater ultimate strength upon hardening. Among these, I prefer hydrated chromium oxid and hydrated titanium oxid. These may be incorporated with the resinous compounds as shown below.

VII(a)

|  | Parts by weight |
|---|---|
| Chromium acetate | 100 |
| Water | 600 |

VII (b)

|  | Parts by weight |
|---|---|
| Titanium sulphate cake | 100 |
| Water | 200 |

VIII(a)

|  | Parts by weight |
|---|---|
| I(c) or II(b) or III(b) or IV(a) | 100 |
| Potassium hydroxid sol. 45 deg. Bé | 52 |
| Water | 600 |
| VII(a) | 30 |

If this solution does not become clear after stirring a few minutes, additional potassium hydroxid solution should be added. More or less of the chromium salt solution than designated may be used if desired, provided that a suitable amount of potassium hydroxid is used to neutralize the acetic acid and to dissolve the resulting hydrated chromium oxid. The solution VIII(a) may now be used as a foaming compound for making cellular concrete, using two pounds, more or less, of the same to each cubic yard of product. The greater the quantity used the more quickly will the foamy batch become thick. The cement cellular product will harden better and attain greater ultimate strength because of the hydrated chromium oxid.

IX(a)

|  | Parts by weight |
|---|---|
| I(c) or II(b) or III(b) or IV(a) | 100 |
| Water | 600 |

IX(b)

|  | Parts by weight |
|---|---|
| VII(b) the titanium mixture | 50 |
| Water | 50 |

IX(c)

|  | Parts by weight |
|---|---|
| Take of IX(a) | 700 |
| Take of IX(b) | 100 | and mix together thoroughly. The mixture, containing disseminated colloidal particles, should then be treated in a colloid mill to break up the clots and to render the mixture homogeneous: Add sufficient calcium hydroxid, (in powdered form), to precipitate the sulfur as calcium sulfate. This amount will approximate fifteen parts by weight but should be closely determined by usual methods of testing. The mixture IX(c) may then be used as a foaming compound for the manufacture of cellular concrete by using two pounds of the same to the cubic yard of cellular concrete to be made. More or less may be used, as stated for the other compounds mentioned. The cement product will harden better and attain a greater ultimate strength because of the hydrated titanium oxid present.

The various foaming compounds described above may be used in a suitable machine described hereinafter or may be used to make a foam which may then be combined with a suitable cement slurry. I prefer to combine the cement slurry and foaming compound before aerating, and to then aerate the mixture in the special and improved machine which is described below.

Referring to the transverse vertical cross section shown in Fig. 1 of the drawing, 10, 11, 12, 13, 14, 15, 16, and 17 indicate a plurality of spiral-cylindrical sheets of wire cloth, expanded or punched sheet metal or other similar material, mounted so as to be spiral in cross section and so fixed to a central shaft 18, Fig. 2 that they revolve with it. The whole is mounted on suitable bearings 19 and 20 within a suitably shaped container 21 having a suitable discharge outlet, and valve 38. At the points 22, 23, 24, 25, 26, 27, 28, and 29 are open spaces between the said wire cloth or the like members. At 30, 31, 32, 33, 34, 35, 36, and 37 are stops or barriers, also made of the same or similar material, that is to say, of wire cloth, expanded or punched sheet metal, or other open structure.

When operating, the shaft and attached members revolve in the direction shown by the arrow A, Fig. 1. Cement and water with or without aggregate forming a thin slurry, are mixed, (usually in an auxiliary slurry mixer), and poured into the container 21, approximately sufficient to fill the same up to the level of the dotted line *f, f*. Sufficient foam compound is then introduced into the machine, and immediately becomes mixed with the slurry giving the same a foamy character,—that is to say, making it to be of a foamy nature. The screen members, after once passing through the slurry, will become coated with numerous thin films, and thereafter when the hollow spaces between the turns of the said spiral-cylindrical screens are submerged in the slurry, numerous air cells will be formed by the discharge of the entrapped air into the slurry through the meshes of the wire cloth or like open structure of the said screen members and barriers. Upon emergence from the slurry, the closed spaces between the screens will again become largely filled with air when the slurry flows out by gravity, and the operation will be repeated during each revolution of the shaft.

The function of the barrier or stop members is to hinder the flow of slurry along the spiral channels between the screen members and to form the closed spaces when the meshes are filled with films, thus carrying the maximum volume of air deeply into the slurry and giving important efficiency to the machine. The use of the stops or barriers increases the efficiency of the operation of the machine to a very important extent over the efficiency available when such stops are not used.

Continued operation of the machine as described will finally use up the available water of the slurry, forming air cells each with a surrounding film of water containing a minute quantity of foaming compound. Thus the aeration will cease when no more water is available, and the slurry will cease to expand in volume as a consequence. If more water is added and the machine operated, then the slurry will further increase in volume due to additional films being formed with air entrapped therein.

A suitable mixture is as follows:—

| | |
|---|---|
| Water_____gallons__ | 8.5 |
| Sand (finer than 50 mesh to the inch) _____cubic foot__ | 1 |
| Cement_____pounds (1 sack)__ | 94 |
| Foaming compound_____ounces__ | 7 |

(Sand should be finer than 50 mesh and coarser than 100 mesh)

When aerated, this mixture will have a volume of approximately six cubic feet, weighing approximately 45 pounds to the cubic foot.

Mixtures of heavier or lighter weight to the cubic foot may be made by correspondingly decreasing or increasing the amount of water used, thus correspondingly decreasing or increasing the proportion of air cells in the batch.

When using foam made by formula I(d), or II(c) or some of the other formulas given above in the manufacture of cellular concrete as described above I have noted that the cells break into one another, opening passages between the cells without causing the collapse of the structure. Upon hardening, the surface of the cellular concrete may be smoothed off to a plane surface by means of a rubbing stone or other appliance, when the porosity of the concrete will prove to be such that air may be blown through the material, or water will flow through it by gravity. Such a structure is efficient as a nonreflecting surface with respect to sound, and material of this sort may be used as an acoustic surface for walls of auditoriums and the like.

My experiments relating to physically rupturing the cell walls were made with specimens of "Bubblestone", a material made from Portland cement and sand and containing numerous cells, (spherical), of air such that the specimens were much lighter than pieces of stone or concrete of the same size would be.

In preparing the specimens for the experiments the following procedure was employed:

(1) The cement, water and sand, (of a fineness passing 50 meshes to the inch but retained on 100 meshes to the inch), were mixed, forming a thick slurry; equal proportions of cement and sand were used;

(2) A small amount of Bubblestone foam compound was diluted with water and beaten to a stiff foam;

(3) A sufficient amount of the foam (2) was thoroughly mixed with the cement slurry (1), to form a plastic cellular concrete of the desired weight, (in this case approximately 30 pounds to the cubic foot). Of course it is obvious that a less proportion of foam would form a lighter product and that a greater proportion of foam would form a heavier product.

The experiment was carried out by placing the plastic cellular concrete in a suitable mold, and the mold containing the cellular concrete was then placed in an airtight container having suitable strength and provided with means for applying air pressure, and means for applying a partial vacuum, and maintaining a pressure or vacuum as long as desired. Upon closing the container, air pressure was applied to the extent of approximately one-half atmosphere,—that is to say, sufficient pressure was applied to support a column of mercury having a height of 16 inches, and the mold in its container was allowed to stand until the cellular concrete had "set" sufficiently to maintain its structure when the air cells might be ruptured. The time allowed was twelve hours with the temperature at 65 degrees F. (With a higher temperature or with an accelerator in the mix this proper time might be less, or with a lower temperature it might be greater.) After 12 hours the pressure was released slowly. This releasing of the air pressure around the mold containing the cellular concrete resulted in expansion of the air within the spherical cells of the cellular concrete with a consequent rupture of the walls of the cells, accomplishing the desired result. Thereafter the mold was set aside a time sufficient to allow the cement to harden, to give the desired strength to the specimen. Thereupon the surface of the specimen was planed off by rubbing with a carborundum brick to give the desired plane surface. It was found to have a freely porous structure such that water would flow freely through it or air could be freely blown through it.

In using the above described methods, the physical conditions essential for success in breaking down the cell walls of a closed and impermeable cellular structure such as pumice substantially hardened "Bubblestone", or cellular slag, or similar materials, are: First, a difference of pressure between the interior of the cells and the outside atmosphere such that the walls of the cells will be ruptured, the air escaping to the atmosphere. Preferably the higher pressure should be within the cells and the lesser pressure without, but the reverse of such condition, if the pressure be sufficient, will also attain the desired result.

Specimens of hardened cellular concrete were placed in the closed container and a pressure applied, amounting to about sixty pounds to the square inch. After allowing them to stand under pressure for a few minutes, the pressure was released. These specimens were found to have been made porous by the breaking down of cell walls. With sufficient pressure, pumice stone may be rendered porous in the same manner.

While I have considered clay herein to be a plastic material when the same is aerated, nevertheless, after it has been formed into cellular material and dried, calcination of such material is obviously the means of making it hard, strong and nonplastic,—a condition in which it will not be made soft or plastic again even if wetted with water. It is at this stage that the pressure method of breaking the cell walls, for forming acoustic material, is best made use of.

When treating weak or substantially hardened cellular concrete as described herein, it will be simpler to use a partial vacuum instead of pressure, as follows:

The plastic cellular concrete may be cast in the molds at atmospheric pressure and allowed to stand until it has reached the desired stage of "setting". It may then be placed in the airtight container and vacuum applied to a sufficient degree, that is, to approximately half an atmosphere, more or less, according to stiffness of the concrete. Atmospheric pressure may be then restored and the mold removed. The exhaustion of the air in the chamber will produce a difference of pressure between the interior of the cells and the outside, resulting in the rupture of the cell walls as before.

Hydraulic pressure may be used as well as pneumatic pressure, when treating hardened material such as pumice.

While I have described above certain materials, processes and apparatus which are particularly suitable for carrying out my invention, it is obvious that modifications may be made in the processes, materials and apparatus without departing from the substance of the invention. Therefore, my invention is not to be considered as limited to the specific disclosures in the present specification, but only as defined in the following claims.

In respect to the aerating device: A simple form of this invention using one of the principles only, omitting the spiral form, may be a single cell composed of a closed envelop of foraminous material such as described, actuated by any device which will transfer the said cell from air to the material to be aerated, and then again to air, alternating more or less continuously from air to slurry and back again. The air, (or other gas) is thus mixed with the slurry and the large bubbles broken or cut up into smaller ones progressively. Instead of moving the cell from air to slurry and then to air again alternately, the cell may be fixed in position while air and slurry are alternately poured over or upon the cell, accomplishing the desired result.

I claim:

1. A stable foam producing agent, for use in producing porous concrete or the like, comprising a condensation product of an aldehyde and a phenol, in combination with hydrated chromium oxid.

2. A stable foam producing agent, for use in producing porous concrete or the like, comprising a condensation product of an aldehyde and a phenol, in combination with hydrated titanium oxid.

3. A stable foam producing agent, for use in producing porous concrete or the like, comprising a condensation product of an aldehyde and a phenol, in combination with hydrated aluminum oxid.

4. A stable foam producing agent, for use in producing porous concrete or the like, comprising a condensation product of an aldehyde and a phenol in combination with hydrated oxid of a metal of the group consisting of aluminum chromium and titanium.

JOHN A. RICE.

CERTIFICATE OF CORRECTION.

Patent No. 2,089,813.                                                      August 10, 1937.

JOHN A. RICE.

It is hereby certified that error appears in the printed specification of the above numbered patent requiring correction as follows: Page 4, second column, line 65, for "lighter" read heavier; and line 67, for "heavier" read lighter; and that the said Letters Patent should be read with these corrections therein that the same may conform to the record of the case in the Patent Office.

Signed and sealed this 5th day of October, A. D. 1937.

Henry Van Arsdale (Seal)                                                           Acting Commissioner of Patents.